United States Patent
Healey

(10) Patent No.: US 7,192,504 B2
(45) Date of Patent: Mar. 20, 2007

(54) ADDING GLASS TO COMPOSITE BONDING SURFACES

(75) Inventor: Michael J Healey, Paris (FR)

(73) Assignee: Airbus UK Limited, Bristol (GB)

( * ) Notice: Subject to any disclaimer, the term of this patent is extended or adjusted under 35 U.S.C. 154(b) by 443 days.

(21) Appl. No.: 10/476,074

(22) PCT Filed: May 22, 2002

(86) PCT No.: PCT/GB02/02386

§ 371 (c)(1),
(2), (4) Date: Oct. 28, 2003

(87) PCT Pub. No.: WO02/098651

PCT Pub. Date: Dec. 12, 2002

(65) Prior Publication Data
US 2005/0077007 A1  Apr. 14, 2005

(30) Foreign Application Priority Data
Jun. 7, 2001 (GB) ................................. 0113916.1

(51) Int. Cl.
B32B 37/00 (2006.01)
(52) U.S. Cl. .................. 156/304.3; 156/304.1
(58) Field of Classification Search ............. 156/304.1, 156/304.3
See application file for complete search history.

(56) References Cited
U.S. PATENT DOCUMENTS 3,431,157 A * 3/1969 Mack .......................... 156/82
3,855,044 A * 12/1974 Riel ............................ 442/19
3,905,855 A   9/1975 Blewett et al.
4,494,165 A * 1/1985 Maheshwari ................ 361/117
4,556,591 A   12/1985 Bannink, Jr.

FOREIGN PATENT DOCUMENTS

| DE | 1800773 A | * | 6/1969 |
| EP | 0 747 209 A1 | | 12/1996 |
| JP | 60-222233 | | 11/1985 |
| JP | 62-23729 | | 1/1987 |
| WO | 01/19936 A1 | | 3/2001 |
| WO | WO-01/19936 A1 | * | 3/2001 |

* cited by examiner

Primary Examiner—Jeff H. Aftergut
(74) Attorney, Agent, or Firm—Nixon & Vanderhye P.C.

(57) ABSTRACT

The present invention relates to a method of bonding together two pieces of composite material (10, 26) by applying a layer of glass fibre (20, 28) to a surface of each piece of composite material 10, 26, and bonding the pieces together by means of adhesive (30) between the layers of glass fibre (10, 26). The inclusion of the glass fibre layers (20, 28) advantageously promotes failure of the bond adjacent the glass fibre-adhesive interface rather than at the glass fibre-composite material interface, with the result that damage to the composite material (10, 26) is minimised, and subsequent repair is made easier.

24 Claims, 2 Drawing Sheets

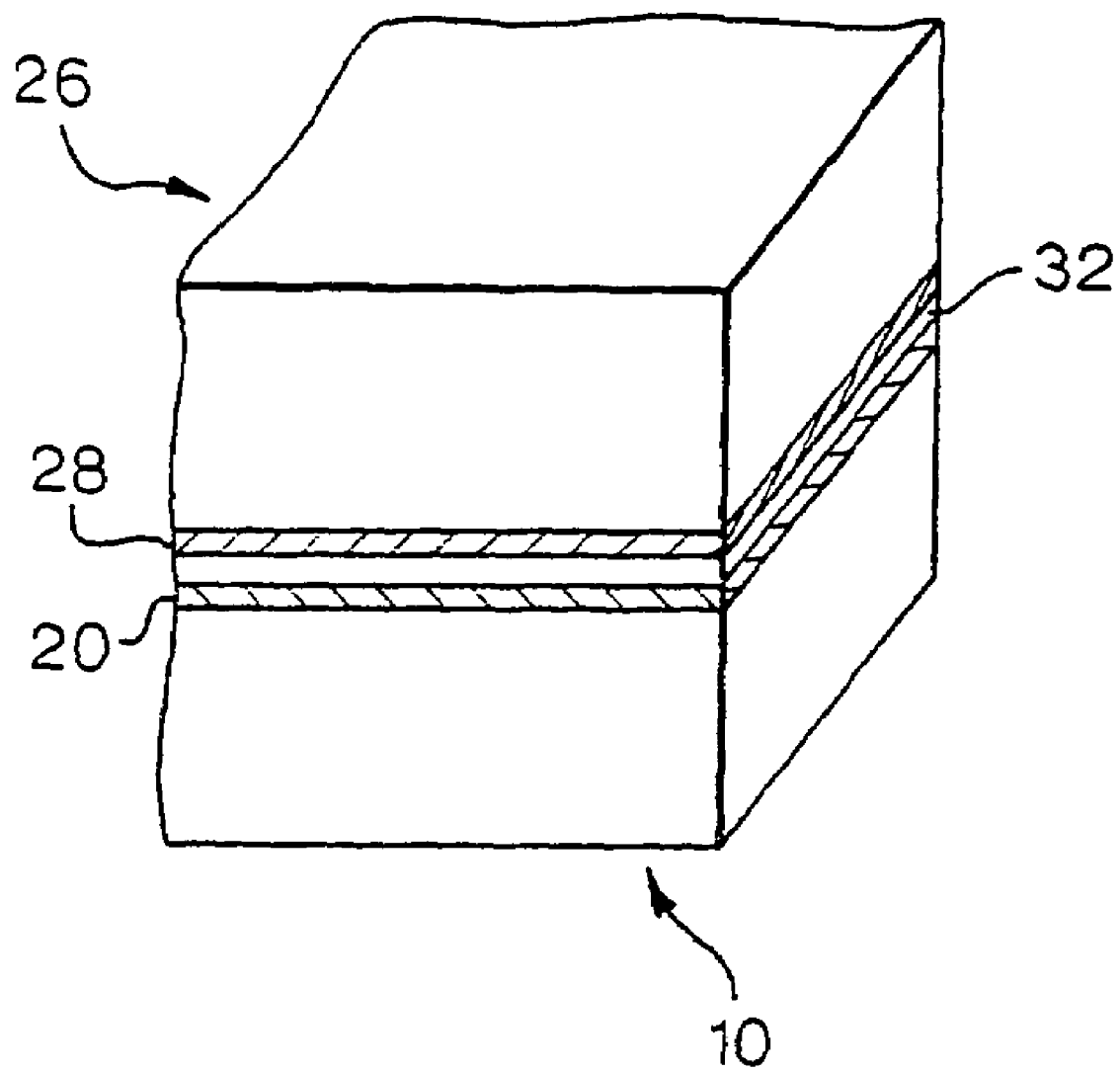

ADDING GLASS TO COMPOSITE BONDING SURFACES

Figure 1:
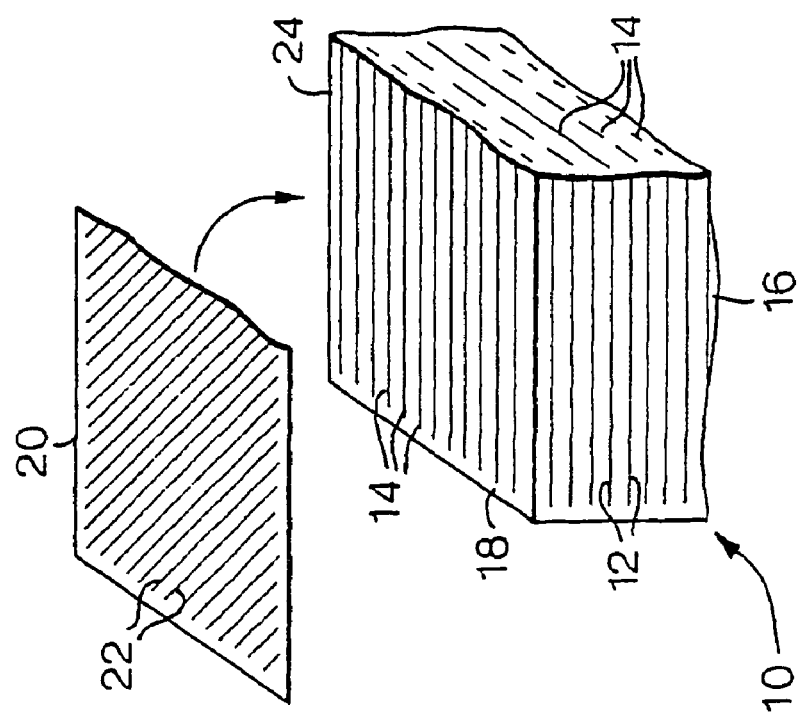
Figure 1:
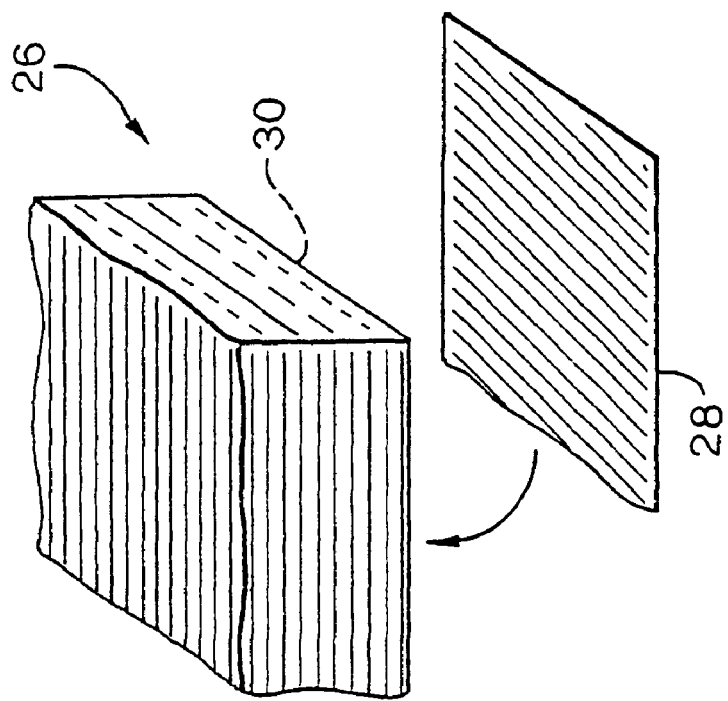

This appliction is the US national phase of international application PCT/GB02/02386 filed 22 May 2002, which designated the US. PCT/GB02/02386 claims priority to GB Aplication No. 0113916.1, filed 7 Jun. 2001. The entire contents of these applications are incorporated herin by reference.

Composite materials, and in particular carbon fibre composite materials, are used for example in the manufacture of components for aircraft such as wings. Such components may be bonded together by adhesive.

In known composite joints, where two substrate surfaces of a composite are bonded together by means of an adhesive there exist different modes of joint failure. For such composite joints, failure within the composite itself, termed cohesive failure, is perhaps the most common. Such a failure progresses to a first 0 degree ply of the composite parallel to the loading direction and results in significant substrate damage. Less commonly cohesive failure can occur within the adhesive with the result that damage to the composite substrate is slight or absent. Such cohesive failure of the adhesive is unusual and more likely denotes a problem with the adhesive. Cohesive failure can also occur near the adhesive/substrate interface and is characterised by a thin layer of debris from one face adhering to the other.

A failure which occurs at, rather than near, the adhesive/composite interface is termed an adhesive failure and is generally characterised by little or no adhering debris on the failure surfaces and low bond strength and is undesirable.

While failure of any joint is undesirable, for the purposes of subsequent repair cohesive failure, and in particular cohesive failure near the adhesive/substrate interface or in the adhesive, is preferred.

In the case of tensile lap joints, joint failure is normally due to local stress concentrations and out of plane loading, induced by bending rather than pure tensile shear. It is known that factors such as tapering the edges of the composites and producing adhesive fillets can reduce concentration of stress. It is also known that making the surface layers more compliant generally reduces the stress concentration, the use of +/−45 degree orientated layers being preferred.

Cohesive failure adjacent the substrate/adhesive interface is known to be promoted by the use of 0 degree orientated plies at the substrate bond surface. However it is usual to have +/−45 degree plies at the surface for reasons of damage tolerance, drill breakout, stress reduction and generally to balance the laminate. The 0 degree orientation enables high failure loads to be achieved, however the magnitude of such failure loads is often undesirable and hence the use of +/−45 degree plies at the substrate surface is often preferred.

According to the present invention there is provided a method of bonding together two pieces of composite material, the method comprising the steps of applying a layer of glass fibre to a surface of each piece of composite material, and bonding the pieces together by means of adhesive between the layers of glass fibre, whereby in the event of failure in the joint, such failure is likely to occur adjacent the adhesive/glass fibre interface and hence minimise damage to the composite material.

It has surprisingly been found that the addition of the layer of glass fibres, and in particular a layer of balance woven glass fibres, on the composite substrate surfaces to be bonded causes a slight reduction in failure load and is believed to change the focus, that is the location, where the failure occurs. Further, when failure does occur it is usually within the adhesive or near the glass-adhesive interface. This leads to reduced or zero damage within the composite substrate beneath, which is advantageous in that subsequent repair of the joint is made easier.

The term glass fibre is intended to cover fibres and threads not only of glass but also other fibres and threads which may produce a similar effect such as, but not limited to, polyaramid, nylon and polyethylene.

The surface of the composite material to which the layer of balance woven glass fibre is applied may comprise an outer layer of fibres at 0, +/−30, +/−45, +/−60, +/−90, or 180 degrees. Preferably the surface of the composite comprises an outer layer of fibres at +/−45 degrees. It will be understood that the above fibre orientations are construed relative to a reference axis of the composite material.

Where one layer of balance woven glass fibre is used, the lay-up of the glass fibres is preferably transverse, for example at 45 degrees, to the fibres of the composite material at the surface to which the glass fibre layer is applied.

A plurality of layers of glass fibre may be used. The layers of glass fibres may be in the form of a fabric. Preferably, the fabric is a woven fabric or a non-crimp bi-axial fabric with fibres aligned at +/−45 degrees or 0 or 90 degrees. It has been observed that the greater the number of glass fibre layers, the lower the failure load and the greater the tendency of the joint to fail at the glass fibre/adhesive interface.

The glass fibre layers are preferably co-cured onto the respective surfaces of the pieces of composite material. In an alternative embodiment the glass fibre layers may be co-bonded onto the respective surfaces of the composite material pieces.

Preferably, the adhesive is a film adhesive such as AF163 or FM73. Alternatively, the adhesive may be a paste adhesive, for example, DLS1436 or Epibond 1590.

The adhesive may be applied such that it forms a layer which is 0.05 to 2.5 mm thick. Preferably, the adhesive layer is 0.2 to 1 mm thick.

In a preferred embodiment, the method includes the step of grit blasting and washing and drying the bond surfaces of the glass fibre layers to improve the adhesive bond of the joint.

It has been found that composites bonded together in accordance with the method of the present invention display a high degree of cohesive failures adjacent the glass fibre/adhesive interface, i.e. failure in the glass fibre layer or adhesive, and not at the glass fibre/composite interface.

In composite bonded joints, a major consideration is repair in the event of damage. Where the joints fail cohesively, such failure is self-destructive to the composite leaving little of the surface remaining for re-bonding. By directing the failure to within the glass fibre-adhesive interface, by using the method of the present invention, the surfaces of the load bearing composites forming the joint are less susceptible to damage and are therefore more likely to be suitable for repair.

It will be noted that the method of the present invention potentially has many uses in the aerospace industry, but particularly in the joining of wing stringers and skins, ribs and spars. Accordingly, the present invention also provides for a composite joint produced by a method in accordance with the present invention.

A method in accordance with the present invention will now be described by way of example and with reference to the accompanying diagrams in which:

FIG. 1 is an exploded diagrammatic view of two pieces of composite material to be bonded by the method of the present invention; and FIG. 2 is a diagrammatic view of the composite pieces bonded by the method of the present invention.

A piece of composite material in the form of a polymer composite substrate, such as CFRP, generally designated 10 comprises layers 12 of fibres 14 contained in resin matrix 16. An outer layer 18 comprises fibres 14 lying in the same direction and are herein referred to as being aligned at 0 degrees.

A layer 20 comprises glass fibres 22 arranged in a mat. The glass fibres 22 in the layer 20 lie at an angle of 45 degrees to the fibres 14 in outer layer 18. The layer 20 is co-cured with an upper surface 24 of the substrate 10 so as to bond thereto. Alternatively the layer 20 could be co-bonded to the upper surface.

A second piece of composite material in the form of a substrate generally designated 26 is substantially identical to the substrate 10 with an outer layer of fibres aligned at 0 degrees. A layer 28, comprising glass fibres, is co-cured to an outer surface 30 of the substrate 26. The fibres in the layer 28 are at an angle of −45 degrees to the fibres in the outer surface 30 of substrate 26.

A thin adhesive film 32 (see FIG. 2) is provided and placed between the layers 20 and 28. In the present example the substrates 10, 26 have a typical thickness of >3 mm, the glass fibre layers 20, 28 a thickness of around 0.3 mm, and the adhesive film a thickness of between 0.2 mm to 1 mm. The adhesive film is heated and/or cured so that a bond is formed between the glass fibre layers 20, 28. If desired a plurality of adhesive films can be used.

It will be noted that a plurality of glass fibre layers may be used. Where a plurality of layers is used, the lay-up of the fibres in each layer may be altered so as to improve the strength of the bond formed and reduce damage to the composites being bonded.

The invention claimed is:

1. A method of bonding together two pieces of composite material, the method comprising the steps of:
   first, applying a layer of glass fibre to a surface of each piece of composite material; and
   second, bonding the pieces together by means of adhesive between the layers of glass fibre, whereby in the event of failure in the joint, such failure is likely to occur adjacent the adhesive/glass fibre interface and hence minimise damage to the composite material.

2. A method according to claim 1, wherein lay-up of the layer of glass fibres is transverse to the outer layer of fibres of the composite material.

3. A method according to claim 2, wherein lay-up of the layer of glass fibres is aligned +/−45 degrees to the outer layer of fibres of the composite material.

4. A method according to claim 1, wherein a plurality of layers of glass fibre are used.

5. A method according to claim 4, wherein the layers of glass fibres are in the form of a fabric.

6. A method according to claim 1, wherein the or each layer of glass fibre is co-cured onto the surfaces of the pieces of composite material.

7. A method according to claim 1, wherein the adhesive is a film adhesive.

8. A method according to claim 1, wherein the adhesive is a paste adhesive.

9. A method according to claim 1, wherein the adhesive is applied such that it forms a layer which is between 0.05 mm and 2.5 mm thick.

10. A method according to claim 9, wherein the adhesive layer is between 0.2 mm and 1 mm thick.

11. A method according to claim 1, wherein the method further includes the step of grit blasting, washing and drying the bonding surface of glass fibre layers prior to the application of the adhesive thereto.

12. A composite joint produced according to the method of claim 1.

13. A method of bonding together two pieces of composite material, the method comprising the steps of:
   first, applying a layer of glass fibre to an opposing surface of each piece of composite material; and
   second, bonding the opposing surfaces of the pieces together by means of adhesive between the layers of glass fibre, whereby in the event of failure in the joint, such failure is likely to occur adjacent the adhesive/glass fibre interface and hence minimise damage to the composite material.

14. A method according to claim 13, wherein lay-up of the layer of glass fibres is transverse to the outer layer of fibres of the composite material.

15. A method according to claim 14, wherein lay-up of the layer of glass fibres is aligned +/−45 degrees to the outer layer of fibres of the composite material.

16. A method according to claim 13, wherein a plurality of layers of glass fibre are used.

17. A method according to claim 16, wherein the layers of glass fibres are in the form of a fabric.

18. A method according to claim 13, wherein the or each layer of glass fibre is co-cured onto the surfaces of the pieces of composite material.

19. A method according to claim 13, wherein the adhesive is a film adhesive.

20. A method according to claim 13, wherein the adhesive is a paste adhesive.

21. A method according to claim 13, wherein the adhesive is applied such that it forms a layer which is between 0.05 mm and 2.5 mm thick.

22. A method according to claim 21, wherein the adhesive layer is between 0.2 mm and 1 mm thick.

23. A method according to claim 13, wherein the method further includes the step of grit blasting, washing and drying the bonding surface of glass fibre layers prior to the application of the adhesive thereto.

24. A composite joint produced according to the method of claim 13.

\* \* \* \* \*